April 27, 1965
L. A. RICHARDS
3,181,098
ELECTRICAL SENSING UNIT FOR MEASURING AND
CONTROLLING WATER IN POROUS MEDIA
Filed Dec. 23, 1963
2 Sheets-Sheet 1
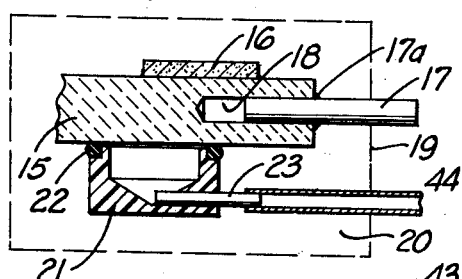
FIG. 1.
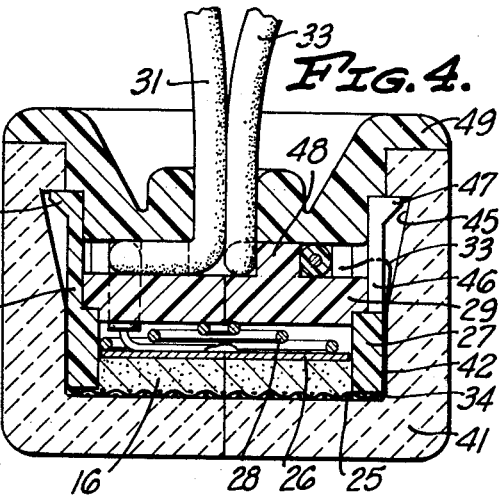
FIG. 4.
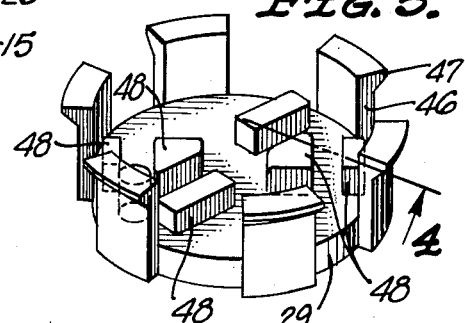
FIG. 2.
FIG. 5.
FIG. 3.
FIG. 6.
FIG. 7.
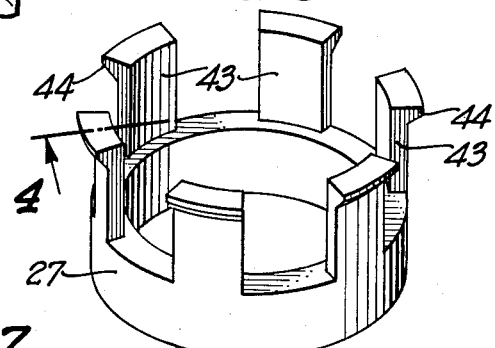
INVENTOR.
LORENZO A. RICHARDS April 27, 1965
L. A. RICHARDS
3,181,098
ELECTRICAL SENSING UNIT FOR MEASURING AND
CONTROLLING WATER IN POROUS MEDIA
Filed Dec. 23, 1963
2 Sheets-Sheet 2
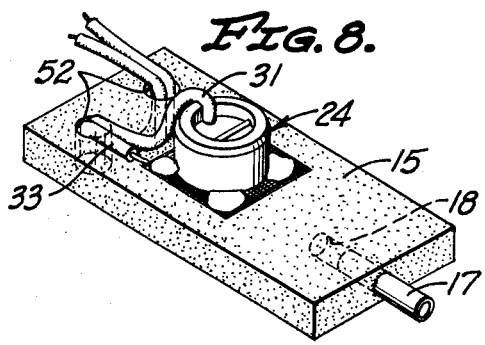
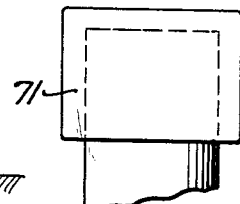
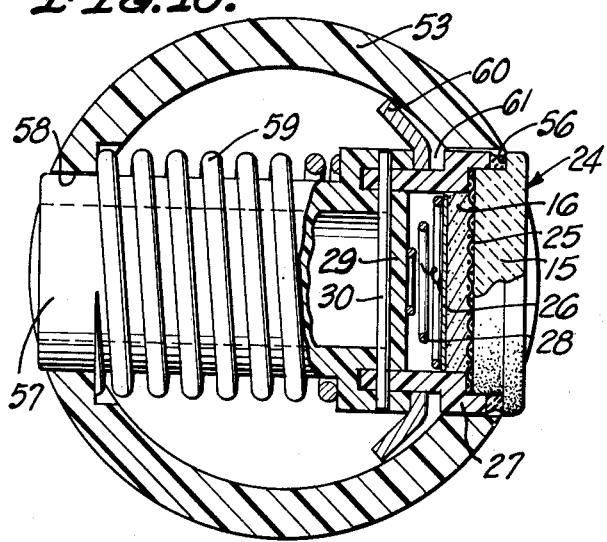
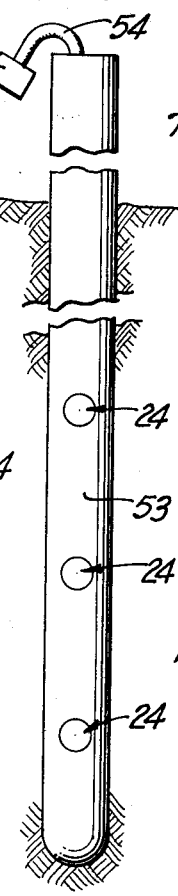
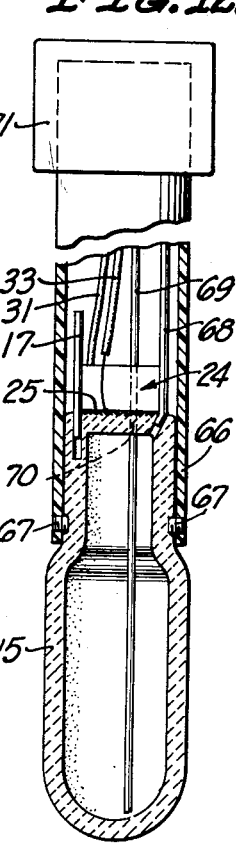
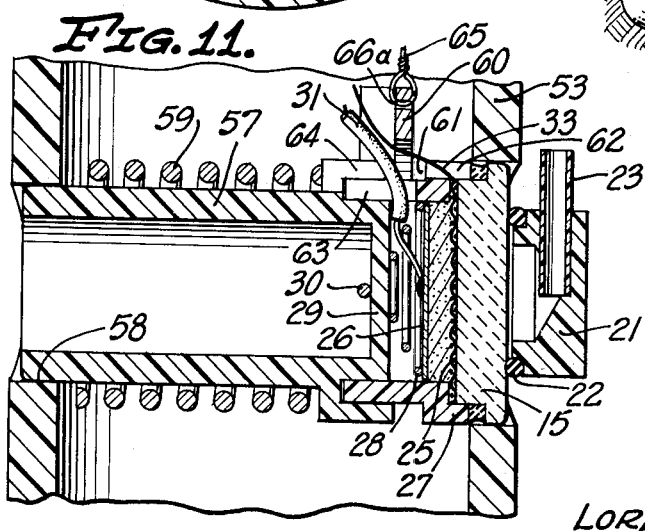
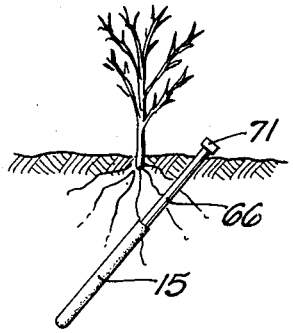
INVENTOR.
LORENZO A. RICHARDS United States Patent Office 3,181,098
Patented Apr. 27, 1965

3,181,098
ELECTRICAL SENSING UNIT FOR MEASURING AND CONTROLLING WATER IN POROUS MEDIA
Lorenzo A. Richards, 4455 5th St., Riverside, Calif.
Filed Dec. 23, 1963, Ser. No. 332,458
20 Claims. (Cl. 338—34)

My invention relates to improved electrical resistance units that can be used for measuring the amount and condition of water in soil and for other purposes such as making automatic irrigation systems responsive to soil-water conditions. Reference is made to my U.S. Patent 2,941,174 which described certain electrical sensing units for measuring water in porous media. The units described and claimed in this application are related broadly to those of the previous patent, however they involve novel features and structures that constitute substantial advances in the art of making electrical sensors for water in soil.

My invention relates especially to sensor units in which a selected, water-absorbing fill material, positioned between electrodes is maintained in close capillary adjustment through a ceramic wall with the medium, as for example, soil in which the water-condition is to be sensed or determined. The reading consists generally of an alternating-current measurement of the resistance, capacitance or impedance of the water-absorbing fill material between the electrodes. To simplify the following description, reference will be made mainly to measurements of the alternating-current resistance of a moisture-sensitive resistor in soil, but the description and discussion apply equally well to capacitance and impedance measurements of such units, and for units in other media than soil, such as foundation materials, foundry sands, concrete, and even for units that are in water-transfer contact with living plant tissue.

Moisture-sensitive resistors that are currently available while serviceable in certain applications are notably deficient in operating characteristics. They are hard to calibrate by scientifically acceptable means and the meager data available indicate they are highly variable from one unit to another. Nevertheless, cast gypsum blocks in which two spaced electrodes are imbedded are widely used as electrical sensing units because they appear to be easy to construct and are easy to install and read. Major disadvantages of gypsum blocks, in addition to those just mentioned are: long response time, low rate of change of resistance in the 0 to 1 bar suction range, drift of calibration due to recrystallization and solubility of gypsum, low sensitivity, and short life.

Objects of my invention are:
(1) To provide an improved moisture-sensitive resistor suitable for use in measuring the amount and condition of water in porous media.
(2) To provide a structure that improves the uniformity and stability of the response characteristics of moisture-sensitive resistors.
(3) To provide a structure that reduces the response time of moisture-sensitive resistors.
(4) To provide moisture-sensitive resistors with very greatly increased sensitivity.
(5) To provide moisture-sensitive resistors that conveniently can be miniaturized.
(6) To provide means that greatly simplify the procedure for routine testing and calibration of moisture-sensitive resistors in pressure chambers.
(7) To provide means for calibrating moisture-sensitive resistors by vacuum techniques at any desired time following installation of units in field soil.
(8) To provide moisture-sensitive resistors that are resistant to disturbance from fluctuations in soil salinity.
(9) To provide means for estimating and eliminating a soil-salinity induced change of calibration of a moisture-sensitive resistor without removal of the resistor from its location in soil or other porous media.
(10) To provide convenient means for improving and insuring the operating contact between the water in the sensor and the water in the soil, especially in soils that shrink and crack on drying.
(11) To provide single moisture-sensitive resistors that are responsive to the average condition of water in a considerable volume of soil or in a soil layer of considerable depth.
(12) To provide water-absorbing fill materials for moisture-sensitive resistors that are far superior to any thus far described for this use.
(13) To provide moisture sensitive resistors that are of simple design, are relatively cheap to produce and yet have all of the advantages described herein.
(14) To provide moisture-sensitive resistors as described which are particularly adaptable to use in controlling automatic irrigation systems.

With the above and other objects in view as may appear hereinafter, reference is now directed to the accompanying drawings in which FIGURE 1 is a vertical cross-sectional view of a unit for calibrating my moisture-sensitive resistors, showing membranes and pressure and/or vacuum connections thereto.

FIGURE 2 is a vertical cross-sectional view showing the sensor element of one of my moisture-sensitive resistors.

FIGURE 3 is a vertical cross-sectional view of another form of my sensor element, shown at right angles to the view in FIGURE 2.

FIGURE 4 is a vertical section of a model of my moisture-sensitive resistor in which the sensitive element is enclosed in a ceramic case.

FIGURE 5 is an isometric view of the cap and spring retainer for the sensor element in FIGURE 4. The radius 4 indicates the angular position of the sectional view in the right half of FIGURE 4.

FIGURE 6 is an isometric view of the cylindrical fill retainer for the sensor element in FIGURE 4. The radius 4 indicates the angular position of the sectional view in the left half of FIGURE 4.

FIGURE 7 is a vertical view of one of my sensor elements attached to the bottom of a cylindrical ceramic unit that is installed at shallow depth in a hole in grass sod.

FIGURE 8 is an isometric view of a sensor element attached to a rectangular plate of ceramic.

FIGURE 9 is a vertical view on a reduced scale of a profile-tube containing several sensor elements, details of which are shown in FIGURES 10 and 11.

FIGURE 10 is a partially sectional, partially plan view of a sensor element that is cross mounted in a hole in a profile tube (FIGURE 9) for insertion in soil.

FIGURE 11 is a vertical cross-sectional view of the unit shown in FIGURE 10.

FIGURE 12 is a vertical view, partially sectional, of a sensor element to which is attached a plastic tube that serves both as a handle for inserting the sensor in soil and as an access tube for electric wires and small service tubes attached to the sensor.

FIGURE 13 is an elevational view of a moisture sensor with an elongated ceramic part for indicating soil-water condition in a considerable volume or depth interval of soil.

In describing and explaining the drawings, the same numbers are used to indicate the same parts or structures in the various figures. Before describing the features of the models shown in the figures it will be helpful to explain briefly some of the principles underlying the operation of the sensors.

The water in unsaturated soil generally forms a film phase that is adsorbed on the surface of the soil mineral particles that constitute the soil matrix. The force of attraction of soil for water is stronger in dry soil where the films are thin, than in wet soil where some of the water extends out further from the surface of the matrix. This attraction for water by forces anchored to the matrix is responsible for water retention by soil and when expressed as force per unit area is called matric suction.

When wet soil is placed on a vacuum filter or vacuum membrane, some water moves out of the soil and through the filter until the water films in the soil become thin enough that the matric suction of the soil becomes numerically equal to the vacuum acting thru the membrane. Matric suction is thus equal to the pressure difference across a water-permeable membrane when the soil has come to water-transfer equilibrium with the membrane. Since the vacuum attainable in water systems is limited by the vapor pressure of water, vacuum membranes can extract water from soil only until the matric suction increases to about 0.8 to 0.9 bar. However, if an air pressure chamber is sealed over the soil on the membrane, the pressure on the outflow side of the membrane can be left at atmospheric pressure and the pressure differences across the membrane can be increased indefinitely. With such pressure-membrane apparatus it has been found that the amount of water retained by most soils at matric suction of 15 bars corresponds closely with what has been called the wilting point. This is the lowest water content at which plants can maintain turgor and continue to grow. Actually, the soil water condition for efficient production of most crops lies in the 0 to 1 or 2 or 3 bar range, depending on crop, soil, weather, etc.

For successful use as a part of the sensing units as well as in calibration equipment, vacuum and pressure membranes must be permeable to water, but also, when wet the pores must be so small that air does not bubble through. Ceramic structures, e.g., plates, are used for vacuum and pressure membranes and porous ceramic materials with bubbling pressures above 15 bars are now available.

When a piece of fine pored ceramic plate is placed in moist soil, it takes up water from the soil until it becomes saturated, if the matric suction of the soil is less than the air-entry pressure or bubbling pressure of the ceramic. After saturation, the matric suction of the ceramic follows along with the average matric suction of the soil with which it is in contact, with a negligible transfer of water being required to change the matric suction of the ceramic. If there is a suction difference between the soil contacting the ceramic and the ceramic material, water moves from the soil into the ceramic if the suction is higher in the ceramic and, conversely, moves from the ceramic into the soil if the suction is higher in the soil, thus tending to equalize the hydraulic condition of the soil water over the surface of contact with the ceramic. Moreover, if a droplet of water is placed on an exposed part of a piece of saturated ceramic that is in suction equilibrium with soil, the water moves into the ceramic and simultaneously moves out into the soil over the whole soil-ceramic contact area.

Conversely, consider what happens if a thin circular disc of granular, water-absorbing material, sometimes referred to hereinafter as the sensor-element fill, is held tightly against a flat surface of a piece of a water-saturated ceramic that is in matric-suction equilibrium with soil. If this disc of material is dry initially, it will absorb water from the ceramic and simultaneously a like volume of water will be supplied to the ceramic by absorption from the soil with which it is in contact. This simply an extension of Pascal's principle to saturated ceramic, i.e., a change of matric suction at one point in the static liquid system of a saturated ceramic is transmitted equally to all other connected points of the water system in the ceramic.

This change will also be quickly transmitted to the water-absorbing fill of a sensing unit that is properly designed and attached to the water saturated ceramic. The objects of my invention set forth above have been accomplished by the discovery and practical application of this modified form of Pascal's principle and by the arrangement, support, composition, and calibration, of the water-absorbing fill in the sensor element.

Advantages of various models of my soil-water sensors will be reviewed after the figures are described in detail, but some additional information is needed at this point to clarify the function of some of the structures shown in the figures.

The water-absorbing fill of the sensor element is kept thin (a thickness of 0.005 to 0.3 or 0.4 cm.) so that it will respond rapidly to a change of suction in the ceramic with which it is in contact. The amount of the water-absorbing fill is kept small so that the sensor element will have high volume sensitivity, i.e., so that it registers a large change in suction per unit volume of water transferred to or from the sensor element. Change of water content of the fill material in the sensor element in response to change of matric suction is of course accompanied by a change in the electrical resistance of the fill material that is disposed between appropriate electrodes. Calibration is accomplished by determining experimentally the relation between the electrical resistance of the fill material and the matric suction of the adjacent ceramic with which it is in equilibrium. The matric suction of the ceramic part of the sensor element can be controlled by vacuum-membrane or pressure-membrane techniques where the ceramic part itself serves as the membrane.

While in the foregoing, porous ceramic has been repeatedly mentioned as the capillary contact medium and mounting base for my soil-water sensors, other rigid porous materials such as partially cemented or sintered ground glass, or glass beads, or porous stainless steel, as are used for vacuum and pressure membranes and could be equally suitable for use in my sensors.

With the above as an introduction, attention is now directed to the various models or types of soil-water sensors and calibration equipment represented and set forth in the drawings.

FIGURE 1 shows a piece of ceramic 15 in plate form supporting a flat layer of water-absorbing granular fill material 16. This represents roughly a sensor element. The tube 17 shown cemented 17a into a bore hole 18 in the ceramic can be attached to a controlled source of vacuum, not shown. The ceramic thus becomes a vacuum filter, and the magnitude of the applied vacuum, measured with respect to atmospheric pressure, controls the matric suction of the water in the ceramic and in the adjacent layer 16 of fill material. With this arrangement a sensor unit can be calibrated by measuring the electrical resistance of the fill at various equilibrium values of suction. Means for measuring resistance, etc., are not shown since they are conventional. The fill material shown in this figure is supported and contained between electrodes as shown in other figures, e.g., FIGURE 2.

Tube 17 can be extended through the wall 19 of an air pressure chamber 20 which is represented by the dashed line in the figure. The ceramic then becomes a pressure membrane for control of matric suction at known values ranging from zero up to the bubbling pressure of the ceramic.

If the particular shape of the ceramic 15 does not conveniently accommodate the bore hole 18 with the attached tube 17, the calibration cap 21 is functionally equivalent and can be attached to the ceramic 15 with a light spring clip (not shown) to any flat surface on the ceramic. The O ring 22 forms a satisfactory seal if the ceramic is flatted with fine abrasive paper. A tube 23 makes connection to the calibration cap 21.

FIGURE 2 shows the ceramic 15 upon which the sensor element 24 is based. The element consists of the metal screen, or screen-like electrode 25, the compression electrode 26, the water absorbing fill 16, the fill retainer 27, the spring 28 and the element cap 29, which compresses the spring and serves as the spring retainer. A metal pin 30 shown at right angles to the section, extends through retainer 27 and cap 29 and locks the cap in place. The electrical conducting wire 31 is insulated from ground except for the electrical impedance of the water-absorbing fill and is attached to the compression electrode 26 by solder, etc. at 32. The electrical conducting wire 33 is connected to screen electrode 25 at 34 by soldering, welding or the like and is at ground potential. The construction isolates the element electrically and prevents disturbance from external current paths during the electrical measurements. The screen electrode 25 and fill retainer 27 are attached to ceramic plate 15 with cement such as epoxy. This seal preferably should not be continuous nor air tight because the air inside the sensor element should remain at atmospheric pressure.

In the structures set forth, the electrodes 25 and 26, the spring 28 and pin 30 are conveniently made of stainless steel or other non-rusting metal, e.g., Monel or the like. The spring is in a helical form in this structure. The fill retainer 27 and cap 29 are made of plastic, such as acrylonitrile butadiene styrene (ABS).

FIGURE 3 shows a unit similar to the one in FIGURE 2, except that the compression electrode 26 is coated with insulation, such as water proof baked varnish. This facilitates measuring the capacitance of the water-absorbing fill 16. Also, the spring 36 shown is stamped from metal sheet stock. The section in FIGURE 3 is drawn at right angles to the plane of the section in FIGURE 2 to give another view of pin 30, showing it passing through holes in the cap at 37 and 38 and fill retainer at 39 and 40.

FIGURE 4 shows a sensing element enclosed in a cup-shaped ceramic 41. Connection from the insulated ground wire 33 to the screen electrode 25 is made by the fine stainless steel wire 42 that is spot welded to the screen electrode 25 at 34. The fill retainer 27 has upwardly extended segmented projections 43 (isometric views of which are shown in FIGURE 6). Projections 43 have outwardly extending upper edges 44 which snap into place in the annular notch 45 on the inside surface of the ceramic cup as the fill retainer is moved into place during assembly. The fill 16, compression electrode 26 with attached wire 31, spring 28 and element cap 29 are then successively assembled. Cap 29 like retainer 27 also has upwardly extending segmented projections 46 (isometric views of which are shown in FIGURE 5). Projections 46 intermesh with projections 43. The outwardly extending edge 47 on projections 46 also snap into place in annular notch 45 as cap 29 is moved into place against the force of the spring 28. Two sets of wire-holding lugs 48 (shown more completely in FIGURE 5) extend upward from the upper surface of cap 29 to form grooves and corners around which the insulated wires are positioned as they are brought to the central location for extending upward through the outer cap 49. If parts 27, 29 and 49 are molded from ABS plastic, they can be welded to each other and to the ceramic with a solvent such as methyl ethyl ketone as 49 is pushed into place in the final assembly operation. Alternatively, but not shown, cap 49 could be molded with flexible downwardly extending projections with outwardly extending edges that would intermesh with projections 43 and 46 and that would also snap into notch 45 to lock the cap 49 onto the sensor element.

FIGURE 5 shows the sensor unit cap 29 in the form used in FIGURE 4 with upwardly extending projections 46 and outwardly extending upper edges 47. It also shows the wire-holding lugs 48 described above. The radius 4 indicates the angular position of the sectional view in the right half of FIGURE 4.

FIGURE 6 shows the fill retainer 27 as used in the unit shown in FIGURE 4, with its upwardly extending projections 43 having outwardly projecting upper edges 44. When assembled the projections 43 and 46 intermesh. The radius 4 indicates the angular position of the sectional view in the left half of FIGURE 4.

FIGURE 7 shows a soil water sensor adapted for lawn irrigation control. The ceramic 15 is a hollow cylindrical cup with a flat end 49 to which the sensor element 24 is attached with cement. The sensor element is not shown in detail but one of the types shown in FIGURES 2 or 3 is useful here. The interior of the cup contains air that is maintained at atmospheric pressure by bore hole 50. The wires 31 and 33 are shown to be anchored to the cup by the band 51. This construction permits installation of the cup to the desired shallow depth in a soil-tube hole with a minimum of disturbance to the sod. The wires are placed in a spade-slit at the desired depth.

FIGURE 8 shows a rectangular ceramic plate 15, to which a sensor element 24 is attached with epoxy. The electric leads 31 and 33 are anchored by passage through appropriate holes 52 in the plate 15. The tube 17 is cemented into bore-hole 18 and provides the outflow connection for pressure membrane calibration. With this design the area of contact between the ceramic and the soil may be made as large as may be required by soil conditions and measurement objectives.

FIGURE 9 shows an arrangement for disposing in soil miniature sensor element 24, at preselected depths with a minimum of disturbance to the soil profile, as is often required in agronomic, engineering and hydrologic exploration, testing and research. These sensor elements are supported in a profile tube made of plastic or other material which does not absorb water and is preferably not electrically or thermally conductive. Electrical leads (not shown in this figure) to one or more sensor elements supported in the profile tube pass upwardly from the sensor element or elements and thence through tube 54 and connect to the electrical socket 55.

FIGURE 10 shows one form of miniature sensor element 24 in place in a profile tube 53. In this case the cement that assembles the ceramic 15, the screen electrode 25, and the fill retainer 27, is applied in an annular groove 56. The fill 16, compression electrode 26 and spring 28 are again retained by the element cap 29 which is anchored by pin 30. The tubular extension 57 on the cap 29 aligns the sensor element in the oppositely positioned guide hole 58 in the profile tube and carries the spring 59 that presses the ceramic 15 against the soil outside the profile tube. Pressure at the ceramic soil contact is desirable when the contact area is small. a U clip 60 riding in circular groove 61 keeps spring 59 compressed and keeps the sensor elements retracted into the sockets in the profile tube 53 until the profile tube is installed to the desired depth in the soil profile in a hole made by a soil tube or by other means. After installation, the U clips are removed. The ceramic elements 15 are then moved out by the springs to make contact with the soil.

FIGURE 11, which shows a miniature sensor element like that shown in FIGURE 9 but in vertical rather than horizontal section and shows also an O ring calibration cap 21 in place on the ceramic plate 15, useful for calibration of the unit in a pressure chamber prior to installation in the soil. A similar calibration cap was described in connection with FIGURE 1. The parts of this cap and O ring seal are numbered as in FIGURE 1 and are so described.

In this figure parts are as described in FIGURE 10. Additionally shown are electric lead wires 31 and 33 attached to compression electrode 26 and screen electrode 25, respectively. In this figure are shown cut out slots 62 and 63 in retainer 27 and mating slot 64 in cap 29 that provide channels for the electrical connections. Fine wire or string 65 which is fastened through hole 66 in U clip 60 serves to remove the clip from the sensor unit after the profile tube is in place in the soil.

FIGURE 12, which is partially sectional, shows a sensor element 24 with several special features for precise work, especially for use in very saline soils. The ceramic cup 15 (similar to that shown in FIGURE 7), has rigid plastic tubing 66 loosely attached with set screws 67. This tubing serves as a handle for inserting the sensor unit in quasi-unidisturbed soil. The sensor element 24 and pressure chamber calibration tube 17 are like those shown in previous figures. Small bore plastic tubes 68 and 69 are connected into the shoulder of the element cap. Tube 68 terminates at the top inside of the ceramic cup 15. Tube 69 extends through hole 70 to the bottom inside of the cup. Both, like the electric wires, are accessible at the top of the plastic tube 66 when the cap 71 is removed.

Assume for example that the sensor element and cup were equilibrated with saturated gypsum solution and that the element was calibrated in a pressure chamber against matric suction. After installation in saline soil, a considerable time would be required to change the salinization of the element because of the long diffusion path from the element to the nearest soil contact with the cup. The extent of salinity contamination can be checked at any time by closing tube 69 and establishing a known vacuum in the air inside the cup. The relation of resistance of the sensing element to matric suction in the 0 to 0.8 bar range can thus be checked against the initial calibration, or a new calibration can be established which can be extrapolated over a wider suction range. During this air-vacuum calibration, the cup should be partially water-filled to approximately the depth of the soil contact so that the calibration can start from the zero suction condition and can be independent of the external soil suction. The applied vacuum would then dominate the matric suction in the ceramic at the contact with the sensor element. By completely filling the cup with solution of known salinity and at moderate positive pressure, the cup and sensor element can be restored to a previously known salinity condition or brought to any new salinity condition. Solution passing outwardly through the cup wall above the soil contact, including that which moves through the fill in the sensor element, will move downward to the soil through the space between tube 66 and the cup 15.

FIGURE 13 illustrates the use of a long ceramic element 15 that will respond to the average matric suction over a considerable region of soil. A plastic tube 66 is shown attached as a handle, with a cap 71 for access to the wires. Drain-cast ceramic in tubular form is relatively inexpensive. This application might be useful for example for answering the question in a humid climate for an annual crop with a developing root system, "Is the subsoil moisture adequate to justify holding off supplemental irrigation a short time longer with the hope of getting rain?," or "Did the light rainfall that just came go deeply enough to do the job?" Farm advisors usually recommend tensiometers at two depths at each selected location in irrigated farms. The same arguments favor using multiple resistance block installations. However, there could be advantage for some cases in using a single long ceramic cup to get similar information.

In view of the design features disclosed in the drawings, the objects and advantages of my invention are further clarified.

Experience with experimental models indicates that my sensor elements are suitable for standardized, large scale, production with moderate costs for time and materials. Procedures adaptable to controlling, testing and even calibrating sensor units produced in volume appear to be easily available. For example, at least 100 elements like that shown in FIGURE 2 can be permanently and reusably mounted on a single standard 28 centimeter diameter pressure plate for getting large scale tests of fill uniformity, calibration characteristic, aging effects and response time.

The gypsum block is the principle moisture-sensitive resister now commercially available and in large scale use. Tests were conducted on a batch of gypsum blocks selected by the manufacturer for uniformity and on a batch of my moisture-sensitive resistors. The test conditions were comparable in every way, including the number of units, the suction range over which the units were cycled, and the number of cycles. The average deviation from the average resistance of all of the units at each of 15 cycles was 26% for the gypsum blocks and 2% for sensor elements of my design. My units exhibit an outstanding improvement in uniformity and stability of calibration.

The time required for a sample of soil to come to suction equilibrium on a pressure membrane is proportional to the square of the height of the sample. The maximum distance of movement of water from the suction control surface for my unit is usually less than 1 or 2 millimeters, whereas the distance from the midpoint between electrodes for gypsum blocks to the soil in some directions through the block is 10 or 20 millimeters. The expected difference in response time was found. My units come to steady resistance readings within 4 to 10 minutes after changing the matric suction in the ceramic, whereas gypsum blocks tested on a pressure membrane generally require several days to attain steady readings after a change of chamber pressure.

The high sensitivity of my units, i.e., the large rate of change of element resistance with change of water content, is attained by using only a small volume of moisture-absorbing material in the fill. The water content of a gypsum block may change as much as several grams over the suction range to which it is subjected under plants in the field. This extra water must be conducted away in the soil or used by the plant thus contributing to the delay in response. The water content change of the fill material for my unit over the same suction range is a very small fraction of one gram and the water content change of the ceramic, (below the air entry suction) is negligible.

It should be pointed out here that in the foregoing discussion it has been specified or assumed the ceramic part in my units has a bubbling pressure or air-entry pressure greater than the maximum suction to be encountered under use conditions. Actually this need not be so. It is true that bubbling can interfere with reliable use of pressure membrane apparatus and that in general the calibration procedure mentioned in connection with FIGURES 1 and 12 will be limited to suction values below the bubbling pressure. Unlike tensiometer ceramics where a single small hole through the wall is completely disabling, the ceramics in my moisture-sensitive resistors can have numerous small cracks and flaws. These will interfere with calibration procedures only if they extend into the calibration cavity, i.e., the bore hole (18 in FIGURE 8) or the ceramic wall behind the O ring calibration cap (21 in FIGURE 11). It has been found for example that tensiometer ceramic which nominally has a bubbling pressure specified only to be greater than 1 bar, works very satisfactorily in my units up to 7 bars.

It is clear that the design of my sensor elements is adaptable to miniaturization. While my "fill" body has been in the range of 10 to 20 millimeters in diameter and 1 to 3 millimeters thick it is clear that these dimensions can be considerably reduced with consequent improvement in response time and sensitivity.

My moisture-sensitive resistors are novel and unique with regard to matric suction calibration. This will go far toward putting the manufacture and use of electrical resistance blocks on a sound scientific and practical basis.

The possibility of vacuum calibration of resistance blocks at convenience, after installation, opens numerous interesting applications, especially in saline soils where, hitherto, resistance blocks have not been much used.

Salt moves through soil mainly by two processes. Dissolved salts are transported by bulk flow of soil solution. The other process, the molecular diffusion of salt through the water films in soil is much slower. Molecular diffusion mainly accounts for salination of moisture-sensitive resistors and in my units, increasing the diffusion path from the soil to the sensor element can increase their usefulness in saline soils. It will for example make my units (especially FIGURE 12) largely unresponsive to short time salinity fluctuations due to periodic fertilization of soils with mineral salts.

Also the possibility of restoring resistance blocks to an old calibration or establishing a new calibration in saline soil as explained in connection with FIGURE 12 is an entirely new and useful operation for resistance blocks.

Two methods are shown for improving and insuring capillary contact between my sensors and the soil. In miniature units with low area of contact, spring pressure can be used. For many other applications the size of the water-saturated ceramic used can be increased as needed to get reliable operating contact, even for difficult soils that shrink and crack.

Even for non-shrinking and non-cracking soils, there may be applications where a long ceramic-soil contact element may be distinctly useful by making the unit responsive to average water condition over a larger region of soil and reducing the number of units to get the required information.

A major advantage of my units over gypsum blocks is the possibility for controlling the composition of the water-absorbing fill material in such a way as to change the resistance-matric suction calibration to fit particular use applications of the sensor element, and still retain other favorable characteristics such as fast response, low drift, etc. Tests have been made with a range of water absorbing fill materials, including fabric woven from high silica glass fibers and carbon-cellulosic materials, but an adequate range of desirable water-absorbing properties has been obtained with mineral particles ranging in size from colloidal clay up to sand sizes.

Desirable characteristics are obtained by altering three characteristics of fill components.

A. Particle size and specific surface. I have made various compositions from commercial kaolinite (fine particles of relatively non-swelling clay), ground quartz, and quartz sand. The water content of a coarse fill changes rapidly at low suction and changes little at high suction. The water content of fine fill changes little at low suction and gives considerable water content change at high suctions. Intermediate responses can be obtained by intermediate mixtures.

B. Electrically conducting particles. I have used lamp black (fine carbon), various size grades of larger carbon particles, and stainless steel powder as fill components along with fill materials as mentioned in paragraph A above. Particles of other electrically conducting, non-soluble, non-corrosive materials, are commercially available. Such components of fill can be used to shift the whole response curve to lower resistance values when desired.

C. Soluble components. Particulate material that has appreciable solubility and that ionizes in water solution can be added to the fill to control or to buffer the electrical conductivity of the water film in the fill at a conductivity value corresponding to saturation for the soluble component. A small amount (1-5%) of powdered gypsum will not disturb water retaining and transmitting properties of the fill, and yet will buffer the conductivity of the solution at a relatively high constant value. Furthermore, this gypsum will last a long time because the only way it can get out is by molecular diffusion through the water in the ceramic extending from the contact with the sensitive element to the soil. Precipitated chalk and carborundum particles are examples less soluble components that have similar effect.

Many of the advantages and desirable characteristics of my sensor element, including the foregoing freedom in selecting material for the fill, are attained by the size and shape of the water absorbing fill, by the method of mounting and retaining the fill, by the design and arrangement of the electrodes and very importantly by the fact that a spring-actuated compression electrode maintains liquid and electrical contact for the element, in spite of shrinking and swelling that occur and are due to wetting and drying, and in spite of changes arising from the disappearance of soluble components that are added to get other beneficial effects. The ceramic and the fill retainer establish a precisely determined area for the fill. The amount of fill added to each element can be determined with any desired degree of precision. Relatively simple jigs and tooling make it possible to measure, install, distribute, smooth and pack the thin layer of fill with considerable uniformity. The rigid flat compression electrode attains good contact with the fill during the first saturation with water and maintains the interparticle pressure within the fill at a steady appreciable value.

There are many kinds of moisture measuring problems in many kinds of soils and other materials. It is fortunate, when needed, to be able to choose the fill material to adapt the sensor's response characteristic to the special particular application. The following is an example of one composition designed for an automatic sprinkler control for ornamental sod. The ingredients were measured by volume as follows:

| | Parts |
|---|---|
| Quartz sand 60-70 mesh (screen openings per inch) | 1 |
| Quartz sand 70-80 mesh | 2 |
| Ground silica 200 mesh | 2 |
| Ground silica 325 mesh | 2 |
| Commercial kaolinite | 2 |

A volume of 0.25 cubic centimeter of this mix was placed in a circular fill retainer of 1.5 square centimeters area to give a fill thickness of 0.16 centimeter. Electrically conductive and water soluble components were not added. The units were wetted with irrigation water having an electrical conductivity of 0.5 millimhos per centimeter at 25° C. The average resistance-matric suction relation was as follows:

| Matric suction bars: | A.C. resistance ohms |
|---|---|
| 0 | 728 |
| 1 | 1480 |
| 2 | 1980 |
| 3 | 2200 |

These were the same units for which data on cycling tests and response time were given above.

The electrical conductivity of salt solutions changes about 2% per degree centigrade change in temperature. Some applications of my soil-water sensors will be sufficiently precise that corrections for this temperature dependence will need to be made. This can be done in several ways. A resistance thermometer mounted integrally with the soil-water sensor element can be read at the same time the sensor reading is taken. The resistance thermometer and the soil-water sensor can be simultaneously calibrated in the pressure chamber and a temperature correction for field readings can be made by known methods.

Although certain embodiments of my invention are shown and described herein, the invention is not to be limited to what has been specifically described. I desire to include within the scope of my invention all the invention within the scope of the appended claims.

I claim:

1. A sensor unit for determining water-condition in porous media, comprising a body of water-absorbing fill material that is maintained under compressive stress between a screen-like electrode and a compression electrode, leadout wires connected to said electrodes, a water-permeable ceramic body for making contact with said porous media and for containing absorbed water that is in matric suction adjustment with water in said porous media, a supporting surface on said ceramic body in water-transfer contact with said fill material through the openings in said screen-like electrode and means for maintaining said compressive stress between said compression electrode, said fill material, said screen-like electrode and said supporting surface of said ceramic body.

2. A sensor unit for determining water-condition in porous media, comprising a thin flat body of granular water-absorbing fill material that is maintained under compressive stress between a screen-like electrode and a compression electrode, leadout wires connected to said electrodes, a water-permeable ceramic body for making contact with said porous media and for containing absorbed water that is in matric suction adjustment with water in said porous media, a flat supporting surface on said ceramic body in water-transfer contact with said fill material through the openings in said screen-like electrode, and means for maintaining said compressive stress between said compression electrode, said fill material, said screen-like electrode and said supporting surface of said ceramic body.

3. A sensor unit for determining water-condition in porous media, comprising a body of water absorbing fill material that is maintained under compressive stress between a screen-like electrode and a compression electrode, leadout wires connected to said electrodes, a water-permeable ceramic body for making contact with said porous media and for containing absorbed water that is in matric suction adjustment with water in said porous media, a supporting surface on said ceramic body in water-transfer contact with said fill material through the openings in said screen-like electrode, a means comprising a compressed spring for maintaining said compressive stress between said compression electrode, said fill material, said screen-like electrode and said supporting surface of said ceramic body.

4. A sensor unit for determining water-condition in porous media, comprising a body of water-absorbing fill material that is maintained under compressive stress between a screen-like electrode and a compression electrode, leadout wires connected to said electrode, a cup-shaped water-permeable ceramic body for making contact with said porous media and for containing absorbed water that is in matric suction adjustment with water in said porous media, a supporting surface on said ceramic body in water-transfer contact with said fill material through the openings in said screen-like electrode, and means for maintaining said compressive stress between said compression electrode, said fill material, said screen-like electrode and said supporting surface of said ceramic body.

5. An electrical sensor unit for determining water-condition in porous media, comprising a body of granular water-absorbing fill material that is maintained under compressive stress between a screen-like electrode and a compression electrode, lead-out wires connected to said electrodes, a porous water-permeable ceramic body in contact with said porous media and containing absorbed water that is in matric suction adjustment with water in said porous media, a supporting surface on said ceramic body in water-transfer contact with said fill material through the openings in said screen-like electrode, means comprising a compressed spring for maintaining the stress applied by the compression electrode to the fill, and an electrically insulating case confining said fill material laterally between said electrodes and confining to the fill material the electrical currents passing between the electrodes during the electrical measurements.

6. An electrical sensor unit for determining water condition in porous media in accordance with claim 5, in which the ceramic body is provided with vacuum means for controlling the matric suction of water in the ceramic body, said means consisting of a tube cemented into a hole in said ceramic body and adapted to be connected to a vacuum line so that the portion of the surface of the ceramic body exposed to the interior of said means can be subject to controlled vacuum to accomplish matric suction calibration of the electrical readings of the water absorbing fill material.

7. An electrical sensor unit for determining water condition in porous media in accordance with claim 5, in which the ceramic body is provided with vacuum means for controlling the matric suction of water in the ceramic body, said means consisting of a pressure-cap sealed to the surface of said ceramic body, a tube sealed into said pressure-cap and adapted for connection to a vacuum system so that the portion of the ceramic surface exposed to the interior of said means can be subjected to controlled vacuum to accomplish matric suction calibration of the electrical readings of the water absorbing fill materials.

8. An electrical sensor unit for determining water-condition in porous media in accordance with claim 5, in which the ceramic body is provided with pressure means for controlling the matric suction of water in the ceramic body, said means comprising a tubular attachment that is sealed to a portion of the surface of said ceramic body so that the portion of the surface of said ceramic body that is exposed to the interior of said means can be maintained at a reference pressure while the remainder of the surface of the ceramic body of the sensor unit is subjected in a pressure chamber to a selectable controlled air pressure equal to or above the reference pressure to accomplish matric suction calibration of the electrical readings of the water absorbing fill material.

9. The method of calibrating an electrical sensor unit of the type described in claim 5 wherein the water system within the pores of said ceramic body is in hydraulic adjustment with bulk water that is maintained at a reference pressure and is contained within a tubular attachment sealed to a portion of the surface of said ceramic body while the remaining portion of the surface of said ceramic body, including that part of the surface to which the electrical sensor element is attached is subjected in a pressure chamber to a selectable controlled air pressure equal to or above said reference pressure to accomplish matric suction calibration of the electrical readings of the water-absorbing fill material.

10. An electrical sensor unit for determining water-condition in porous media in accordance with claim 5, in which said water absorbing fill consists of a layer of fibrous water absorbing material, resistant to deterioration by water, such as silica fibers.

11. An electrical sensor unit for determining water-condition in porous media in accordance with claim 5, in which said water absorbing fill consists of a layer of relatively non-swelling, water resistant granular material comprising a homogeneous mixture of kaolnite, ground quartz and quartz sand.

12. An electrical sensor unit for determining water-condition in porous media in accordance with claim 5, in which said water absorbing fill consists of relatively insoluble soil mineral particles sized between colloidal clay and those passing a conventional screen sieve with 60 openings per inch.

13. An electrical sensor unit for determining water-condition in porous media in accordance with claim 5, in which said water absorbing fill consists of mineral particles that are, relatively, insoluble in water, stable in water, electrically non-conducting, and are sized between colloidal clay and those passing a conventional screen sieve with 60 openings per inch with selected additions of relatively soluble finely ground components that ionize in solution to buffer the electrical conductivity of the solution in the sensor unit.

14. An electrical sensor unit for determining water-condition in porous media in accordance with claim 5, in which said water absorbing fill consists of mineral particles that are, relatively, insoluble in water, stable in water, electrically non-conducting, and are sized between colloidal clay and those passing a conventional screen sieve with 60 openings per inch with selected additions of finely granular electrically conductive solid material.

15. An electrical sensor unit for determining water-condition in porous media in accordance with claim 5, in which said water absorbing fill consists of mineral particles that are, relatively, insoluble in water, stable in water, electrically non-conducting, and are sized between colloidal clay and those passing a conventional screen sieve with 60 openings per inch, with selected additions of both finely granular, slightly soluble materials and electrically conducting solid materials.

16. An electrical sensor unit for determining water-condition in porous media, comprising a body of granular water-absorbing fill material that is maintained under compressive stress between a screen-like electrode and a compression electrode, lead-out wires connected to said electrodes, a porous water-permeable ceramic body in contact with said porous media and containing absorbed water that is in matric suction adjustment with water in said porous media, a supporting surface on said ceramic body in water-transfer contact with said fill material through the openings in said screen-like electrode, means comprising a compressed spring for maintaining the stress applied by the compression electrode to the fill, and a rigid electrically insulating case confining said fill material laterally between said electrodes and confining to the fill material the electrical currents passing between the electrodes during the electrical measurements, said ceramic body having the shape of a hollow cylinder with closed ends, with the sensor element attached to the upper end of said cylinder with a tubular handle attached to the upper part of said cylinder, with two small-bore tubes extending through the tubular handle and sealed through the upper wall of said cylinder, one of said tubes terminating at the top of the cavity in the said hollow cylinder and the other said tube terminating at the bottom of said cavity, the electrical lead-out wires from the sensor unit and the free ends of said small tubes being accessible at the top end of said tubular handle, and a cap closing the top end of said tubular handle.

17. A sensor unit for determining water-condition in porous media, comprising a body of water-absorbing fill material that is maintained under compressive stress between a screen-like electrode and a compression electrode, lead-out wires connected to said electrodes, a cup-shaped water-permeable ceramic body making contact with said porous media and containing absorbed water that is a matric suction adjustment with water in said porous media, a supporting surface on said ceramic body in water-transfer contact with said fill material through the openings in said screen-like electrode, and means comprising a compressed spring for maintaining said compressive stress between said compression electrode, said fill material, said screen-like electrode and said supporting surface of said ceramic body; said cup-shaped ceramic body having a cylinder cavity with a flat bottom and an axial circular groove cut into the internal circular surface to form a notch that is located near the top end of said cylindrical cavity, said screen-like electrode fitting against said bottom, a cylindrical fill retainer with spaced upwardly and outwardly extending edges that lock into said notch when said retainer is assembled against said screen electrode, a sensor unit cap that also has spaced upwardly and outwardly extending edges that intermesh with said edges on said fill retainer and which also lock into said notch as said cap is assembled by compressing said spring against said compression electrode which places said fill under compression stress, and an outer cap which anchors said lead-out wires and completes the closure for the sensor unit.

18. An electrical sensor unit for determining water-condition in porous media, comprising a body of granular water-absorbing fill material that is maintained under compressive stress between a screen-like electrode and a compression electrode, lead-out wires connected to said electrodes, a porous water-permeable ceramic body making contact with said porous media and containing absorbed water that is in matric suction adjustment with water in said porous media, a supporting surface on said ceramic body in water-transfer contact with said fill material through the openings in said screen-like electrode, means comprising a compressed spring for maintaining the stress applied by the compression electrode to the fill, and a rigid electrically insulating case confining said fill material laterally between said electrodes and confining to the fill material the electrical currents passing between the electrodes during the electrical measurements, said ceramic body being elongated or extended in size as may be necessary to maintain capillary contact with the water system in adjacent porous media that may be subject to considerable swelling and shrinking during water content changes.

19. An electrical sensor unit for determining water-condition in porous media, comprising body of granular water-absorbing fill material that is maintained under compressive stress between a screen-like electrode and a compression electrode, lead-out wires connected to said electrodes, a porous water-permeable ceramic body making contact with said porous media and containing absorbed water that is in matric suction adjustment with water in said porous media, a supporting surface on said ceramic body in water-transfer contact with said fill material through the openings in said screen-like electrode, means comprising a compressed spring for maintaining the stress applied by the compression electrode to the fill, and a rigid electrically insulating case for confining said fill material laterally between said electrodes and for confining to the fill material the electrical currents passing between the electrodes during the electrical measurements, said ceramic body being elongated or extended in size as may be necessary to enable the sensor unit to register the average water-condition in an extensive mass or considerable depth interval of said porous media.

20. An electrical sensor unit for determining water-condition in porous media, comprising a body of granular water-absorbing fill material that is maintained under compressive stress between a screen-like electrode and a compression electrode, lead-out wires connected to said electrodes, a porous water-permeable ceramic body making contact with said porous media and containing absorbed water that is in matric suction adjustment with water in said porous media, a supporting surface on said ceramic body in water-transfer contact with said fill material through the openings in said screen-like electrode, means comprising a compressed spring for maintaining the stress applied by the compression electrode to the fill, and a rigid electrically insulating case confining said fill material laterally between said electrodes and confining to the fill material the electrical currents passing between the electrodes during the electrical measurements, said moisture sensitive unit being latched along with a compressed spring in a socket such that when the socket-unit assembly is buried in said porous media, the latch can be operated and said spring will maintain a forceful yieldable contact between the ceramic body of said unit and adjacent porous media.

References Cited by the Examiner
UNITED STATES PATENTS

| | | | |
|---|---|---|---|
| 2,714,149 | 7/55 | Craig et al. | 338—35 |
| 2,793,527 | 5/57 | Turner et al. | 338—34 |
| 2,872,668 | 2/59 | Mason | 340—235 |
| 2,941,174 | 6/60 | Richards | 338—34 |

RICHARD M. WOOD, *Primary Examiner.*